United States Patent
Zhang et al.

(10) Patent No.: US 11,899,302 B2
(45) Date of Patent: Feb. 13, 2024

(54) DISPLAY PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shubai Zhang, Beijing (CN); Jiantao Liu, Beijing (CN); Haiwei Sun, Beijing (CN); Ming Zhai, Beijing (CN); Yutao Hao, Beijing (CN); Litao Fan, Beijing (CN); Shuo Wang, Beijing (CN); Qin Xin, Beijing (CN); Zhiqiang Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 17/424,423

(22) PCT Filed: Jan. 26, 2021

(86) PCT No.: PCT/CN2021/073714
§ 371 (c)(1),
(2) Date: Jul. 20, 2021

(87) PCT Pub. No.: WO2021/169703
PCT Pub. Date: Sep. 2, 2021

(65) Prior Publication Data
US 2022/0308382 A1    Sep. 29, 2022

(30) Foreign Application Priority Data
Feb. 28, 2020    (CN) .................... 202010131445.9

(51) Int. Cl.
*G02F 1/1333*    (2006.01)
*G02F 1/1335*    (2006.01)
*G06V 40/13*    (2022.01)

(52) U.S. Cl.
CPC .... *G02F 1/13338* (2013.01); *G02F 1/133553* (2013.01); *G06V 40/1318* (2022.01)

(58) Field of Classification Search
CPC ..................... G02F 1/13338; G02F 1/133553
(Continued)

(56) References Cited

U.S. PATENT DOCUMENTS

| 6,839,108 B1 | 1/2005 | Hirakata et al. |
| 2010/0182532 A1 | 7/2010 | Lin et al. |

(Continued)

FOREIGN PATENT DOCUMENTS

| CN | 109031512 A | 12/2018 | |
| CN | 110187537 | * 8/2019 | ........... G02F 1/1333 |

(Continued)

OTHER PUBLICATIONS

International Search Report received for PCT Patent Application No. PCT/CN2021/073714, dated May 7, 2021, 9 pages (3 pages of English Translation and 6 pages of Original Document).
(Continued)

*Primary Examiner* — Charles S Chang
(74) *Attorney, Agent, or Firm* — WOMBLE BOND DICKINSON (US) LLP

(57) ABSTRACT

The present application proposes a display panel and a display device, the display panel includes a liquid crystal display module, a reflective film and a fingerprint identification module. The liquid crystal display module is on a first side of the reflective film, and the fingerprint identification module is on a second side of the reflective film opposite to the first side. The fingerprint identification module includes an invisible light emitting unit and an invisible light sensor. The invisible light emitting unit is configured to emit invisible light in a direction towards the reflective film, and the invisible light sensor is configured to receive reflected
(Continued)

invisible light. The reflective film is configured to transmit the invisible light and reflect visible light reaching the reflective film through the liquid crystal display module.

17 Claims, 3 Drawing Sheets

(58) Field of Classification Search
USPC .......................................................... 349/12
See application file for complete search history.

(56) References Cited

U.S. PATENT DOCUMENTS

| | | | |
|---|---|---|---|
| 2012/0127084 A1* | 5/2012 | Large | G06F 3/0416 345/173 |
| 2017/0124376 A1 | 5/2017 | Wyrwas et al. | |
| 2019/0296266 A1* | 9/2019 | Kim | H10K 59/40 |
| 2020/0073044 A1* | 3/2020 | Wang | G02B 6/0055 |
| 2020/0183065 A1 | 6/2020 | Haag et al. | |

FOREIGN PATENT DOCUMENTS

| | | |
|---|---|---|
| CN | 110187537 A | 8/2019 |
| CN | 110383123 A | 10/2019 |
| CN | 110458150 A | 11/2019 |
| CN | 209728221 U | 12/2019 |
| CN | 111258099 A | 6/2020 |
| JP | 11-326953 A | 11/1999 |

OTHER PUBLICATIONS

Office Action received for Chinese Patent Application No. 202010131445.9, dated Sep. 27, 2021, 12 pages (5 pages of English Translation and 7 pages of Office Action).

* cited by examiner

DISPLAY PANEL AND DISPLAY DEVICE

CROSS REFERENCE TO RELATED APPLICATION

The present application is a 35 U.S.C. 371 national stage application of a PCT International Application No. PCT/CN2021/073714, filed on Jan. 26, 2021, which claims the benefit of Chinese Patent Application No. 202010131445.9 filed on Feb. 28, 2020, the entire disclosure of which is incorporated herein by reference.

TECHNICAL FIELD

The present disclosure relates to the field of display technologies, specifically to a display panel and a display device.

BACKGROUND

At present, the organic light emitting diode (OLED) display technology has been rapidly developed, but liquid crystal display (LCD) panels still predominate in the terminal display products, and their market share can reach 60%-70%. People also expect LCD products to have more and more abundant functions. For example, the fingerprint identification function is desired to be better integrated into a liquid crystal display. Due to the limitation of the structure of the liquid crystal display, a light-through hole is usually fabricated in the color filter substrate, and light reflected by a fingerprint is transmitted through the light-through hole to a fingerprint identification module for fingerprint identification by means of a pinhole imaging method. However, arranging a light-through hole in the color filter substrate will lead to the problem of dark display regions.

SUMMARY

An embodiment of the present disclosure provides a display panel comprising a liquid crystal display module, a reflective film, and a fingerprint identification module. The liquid crystal display module is located on a first side of the reflective film, and the fingerprint identification module is located on a second side of the reflective film opposite to the first side, the fingerprint identification module comprises an invisible light emitting unit and an invisible light sensor, the invisible light emitting unit is configured to emit invisible light in a direction towards the reflective film, the invisible light sensor is configured to receive invisible light reflected, the reflective film is configured to transmit the invisible light and reflect visible light reaching the reflective film through the liquid crystal display module.

According to some embodiments of the disclosure, the reflective film comprises a plurality of reflective layers having different refractive indexes.

According to some embodiments of the disclosure, each of the plurality of reflective layers comprises zinc selenide and silicon dioxide.

According to some embodiments of the disclosure, the plurality of reflective layers comprises a first reflective layer, a second reflective layer and a third reflective layer, wherein the second reflective layer is between the first reflective layer and the third reflective layer, and a thickness of the third reflective layer is larger than a thickness of the first reflective layer and smaller than a thickness of the second reflective layer.

According to some embodiments of the disclosure, each of the first reflective layer, the second reflective layer and the third reflective layer comprises a plurality of zinc selenide layers and a plurality of silicon dioxide layers stacked alternately on each other, wherein a thickness of each of the zinc selenide layers is smaller than a thickness of each of the silicon dioxide layers.

According to some embodiments of the disclosure, the liquid crystal display module comprises a front light source and a display unit on the first side of the reflective film, the display unit is between the front light source and the reflective film, and the display unit comprises a liquid crystal layer.

According to some embodiments of the disclosure, the front light source comprises a light guide plate and a visible light emitting element, the light guide plate is configured to receive visible light from the visible light emitting element and guide the visible light to the display unit.

According to some embodiments of the disclosure, the light guide plate comprises a body and a plurality of light extraction protrusions, the plurality of light extraction protrusions is located on a light exit surface of the body facing the display unit.

According to some embodiments of the disclosure, the display panel further comprises a transparent substrate between the plurality of light extraction protrusions and the display unit, the transparent substrate is configured to support the plurality of light extraction protrusions.

According to some embodiments of the disclosure, the plurality of light extraction protrusions comprise a frustum, wherein the frustum comprises a first surface attached to the body and a second surface opposite to the first surface, wherein an area of the second surface is greater than an area of the first surface.

According to some embodiments of the disclosure, the frustum comprises a regularly quadrangular frustum, the regularly quadrangular frustum comprising a side surface between the first surface and the second surface, the second surface and the side surface forms an angle ranging from 39.8° to 74.8°.

According to some embodiments of the disclosure, a distance from the invisible light sensor in the fingerprint identification module to a light incident surface of the body is smaller than a distance from the invisible light sensor to the side surface of the body.

According to some embodiments of the disclosure, the plurality of light extraction protrusions are distributed on the light exit surface of the body at intervals, a distribution density of the light extraction protrusions in a region of the light exit surface close to the visible light emitting element is smaller than a distribution density of the light extraction protrusions in a region of the light exit surface away from the visible light emitting element.

According to some embodiments of the disclosure, the body of the light guide plate comprises a light incident surface for receiving visible light from the visible light emitting element and a side surface opposite to the light incident surface, wherein a distribution density of the light extraction protrusions on the light exit surface gradually increases along a direction from the light incident surface to the side surface.

According to some embodiments of the disclosure, the fingerprint identification module further comprises a lens, and the lens is configured to converge invisible light reflected after passing through the reflective film to the invisible light sensor.

According to some embodiments of the disclosure, a wavelength range of the invisible light comprises 800 nm to 1200 nm, and a wavelength range of the visible light comprises 380 nm to 780 nm.

Another embodiment of the present disclosure provides a display device comprising the display panel described in any of the foregoing embodiments.

BRIEF DESCRIPTION OF DRAWINGS

By referring to the detailed description of exemplary implementations of the non-limiting embodiments with reference to the following drawings, other features, purposes and advantages of the technical solutions provided by the embodiments of the present disclosure will become more apparent.

DETAILED DESCRIPTION

Figure 1:
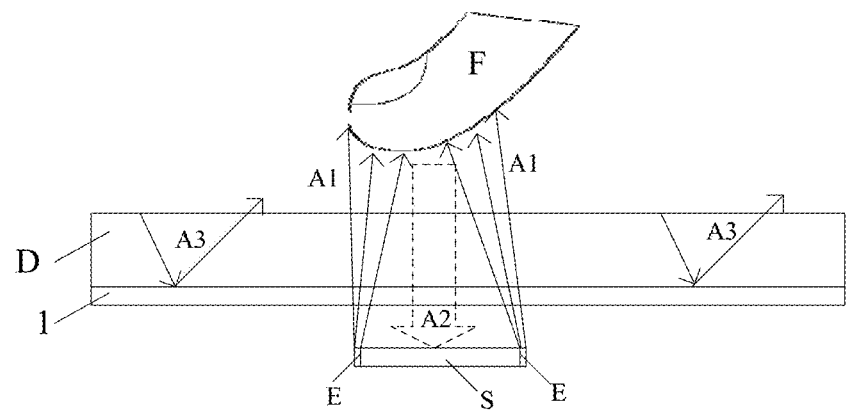
FIG. 1 illustrates the main structure of a display panel provided by an embodiment of the disclosure, in which a human finger F is shown to illustrate reflection of invisible light from a fingerprint identification module.

The technical solution of the present application will be further described in detail below with reference to the drawings and embodiments. It can be understood that the specific embodiments described here are only used to explain the principle of the technical solution of the present application, rather than to limit the protection scope of the present application. In addition, to facilitate description, only the portions of the display panel related to the technical solution of the present application are shown in the drawings, and the entire structure of the display panel is not shown.

It is to be noted that, in the case of causing no conflict, the embodiments of the present application and the features in the embodiments can be combined with each other to form other different embodiments, and these other different embodiments also fall within the protection scope of the application.

FIG. 1 schematically shows the main structure of a display panel provided by an embodiment of the present disclosure. As shown in FIG. 1, the display panel comprises a liquid crystal display module D, a reflective film 1, and a fingerprint identification module. The liquid crystal display module D is located on a first side of the reflective film 1, and the fingerprint identification module is located on a second side of the reflective film 2 opposite to the first side. The fingerprint identification module comprises an invisible light emitting unit E and an invisible light sensor S. The invisible light emitting unit E is configured to emit invisible light in a direction towards the reflective film 1, the invisible light sensor S is configured to receive reflected invisible light, and the reflective film 1 is configured to transmit the invisible light and reflect visible light reaching the reflective film 1 through the liquid crystal display module. The invisible light emitted from the invisible light emitting unit E of the fingerprint identification module may reflected by an external object (for example, a human finger F). In FIG. 1, arrows A1 and A2 denote the invisible light emitted from the invisible light emitting unit E and the reflected invisible light reflected by the finger F to the invisible light sensor S, respectively. An arrow A3 in FIG. 1 denotes the visible light that reaches the reflective film 1 through the liquid crystal display module D and is in turn reflected by the reflective film 1.

According to the embodiment of the disclosure, the liquid crystal display module D itself may comprise a light source, and the light source may generate visible light as shown by the arrow A3 in FIG. 1. Alternatively, the liquid crystal display module may not comprise a light source. In this case, the visible light denoted by the arrow A3 in FIG. 1 may comprise external ambient light. According to some embodiments of the present disclosure, the liquid crystal display module D may comprise an array substrate, a color filter substrate, and a liquid crystal layer therebetween. In the case where the liquid crystal display module may not comprise a light source, the reflective layer 1 may reflect external ambient light entering the display panel, thereby realizing normal display functions.

Figure 2:
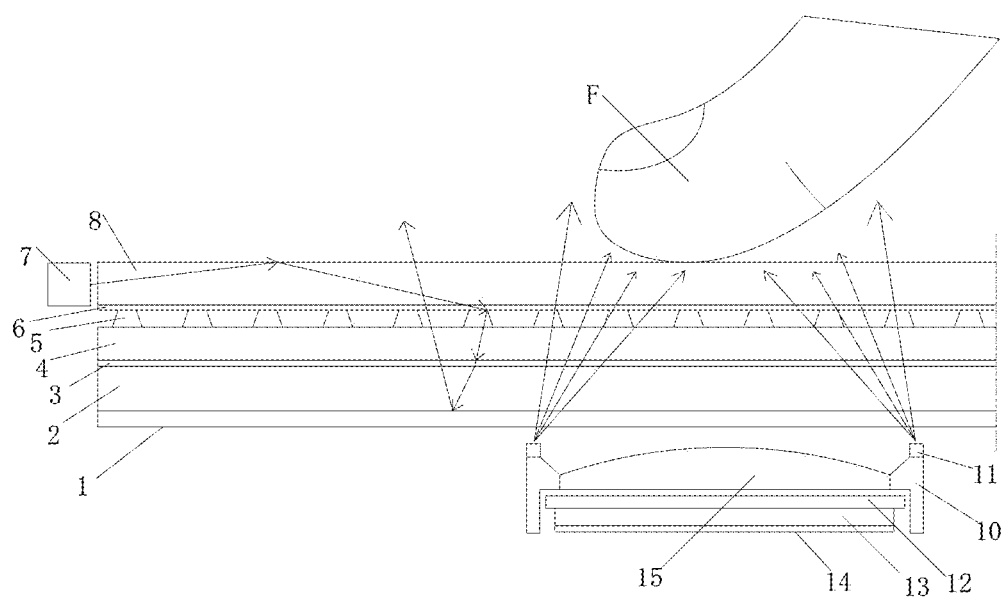
FIG. 2 illustrate the main structure of a display panel provided by another embodiment of the present disclosure, in which invisible light emitted by a fingerprint identification module and visible light propagating in a light guide plate are illustrated.

FIG. 2 schematically shows the main structure of a display panel provided by another embodiment of the present disclosure. As shown in FIG. 2, the display panel comprises a liquid crystal display module, a reflective film 1 and a fingerprint identification module. The liquid crystal display module and the fingerprint identification module are disposed on two sides of the reflective film 1, respectively. The fingerprint identification module comprises an invisible light emitting unit 11 and an invisible light sensor 12. The invisible light emitting unit 11 is configured to emit invisible light towards the reflective film 1, and the invisible light sensor 12 is configured to receive reflected invisible light. Similarly, the reflective film 1 is used to transmit invisible light and reflect visible light from the liquid crystal display module.

The visible light mentioned herein refers to light that can be perceived by human eyes, and the invisible light refers to light that cannot be perceived by human eyes, including but not limited to, for example, infrared light, ultraviolet light, and the like.

When the display panel with fingerprint identification function as shown in FIG. 1 or FIG. 2 is in operation, the invisible light emitting unit emits invisible light, and the invisible light passes through the reflective film 1 and the liquid crystal display module in sequence to reach an object (for example, a finger F) to be identified. After the invisible light is reflected by the finger F, it passes through the liquid crystal display module and the reflective film 1 in sequence, and is received by the invisible light sensor. Since invisible light reflected by ridges and valleys of a fingerprint has different intensities, the reflected invisible light carries information of ridges and valleys of the fingerprint, and the invisible light sensor determines the pattern of the fingerprint according to the intensities of the reflected invisible light. During the fingerprint identification process, since the visible light travelling in the liquid crystal display module cannot pass through the reflective film 1, the visible light will not have an adverse effect on fingerprint identification. Therefore, the liquid crystal display module can perform normal image display during the fingerprint identification process. The display panel shown in FIG. 2 mainly differs from that of FIG. 1 in that the liquid crystal display module in the display panel shown in FIG. 2 comprises a light source (which may be referred to as a front light source herein), and the light source may comprise a light emitting element 7, a light guide plate, and the like, which will be described in detail later. As shown in FIG. 2, light emitted from the light emitting element 7 reaches the reflective layer 1 through the light guide plate, the liquid crystal layer and other structures, and is reflected by the reflective layer 1 back to the liquid crystal display module. Therefore, even at night or in situations where the ambient light condition is poor, the display panel can also achieve normal display, and at the same time improve the effect of fingerprint identification.

As described above, the reflective film transmits invisible light and reflects visible light that reaches the reflective film through the liquid crystal display module. Therefore, the reflective film 1 may be regarded as a selectively transmissive film, which can only transmit light within a predetermined wavelength range while reflecting light of other wavelengths. According to an embodiment of the present disclosure, the reflective film comprises a plurality of reflective layers with different refractive indexes to achieve the above selectively transmissive function. For example, the reflective film 1 may comprise a plurality of reflective layers stacked on each other, and adjacent reflective layers of the plurality of reflective layers have different refractive indexes, so as to realize reflection of light in a specific wavelength range. Generally, it is possible to determine the wavelength range the reflective film can transmit and the wavelength range it reflects by controlling the thickness of each reflective layer in the reflective film (correspondingly, controlling the refractive index of each reflective layer).

Next, the implementation of the above-mentioned reflective film will be described in detail by way of example.

According to an embodiment of the present disclosure, the above visible light has a wavelength range of 380 nm to 780 nm, and the invisible light may include infrared light having a wavelength range of 800 nm to 1200 nm. The reflective film is configured to transmit infrared light in the wavelength range of 800 to 1200 nm, and reflect visible light in the wavelength range of 380 to 780 nm. The above reflective film may be made of zinc selenide and silicon dioxide, that is, each reflective layer of the reflective film includes zinc selenide and silicon dioxide.

Figure 3:
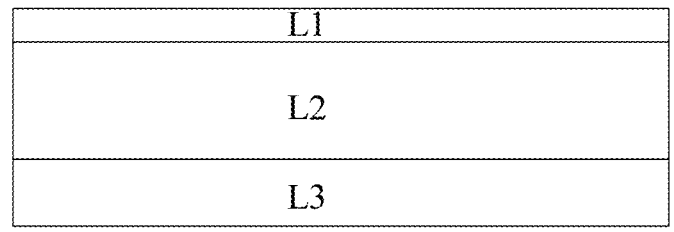
FIG. 3 is a schematic structural view of a reflective film in a display panel provided by an embodiment of the disclosure.

According to some embodiments of the present disclosure, as shown in FIG. 3, the reflective film comprises a first reflective layer L1, a second reflective layer L2, and a third reflective layer L3. The second reflective layer L2 is located between the first reflective layer L1 and the third reflective layer L3, and the thickness of the third reflective layer L3 is larger than the thickness of the first reflective layer L1 but smaller than the thickness of the second reflective layer L2. The first reflective layer L1, the second reflective layer L2, and the third reflective layer L3 all include zinc selenide and silicon dioxide. Therefore, the first reflective layer can substantially realize reflection of blue light wavelength, the second reflective layer can substantially realize reflection of yellow light wavelength, and the third reflective layer can substantially realize reflection of red light wavelength.

Further, in order to better realize transmission of infrared light in the wavelength range of 800 to 1200 nm and reflection of visible light in the wavelength range of 380 to 780 nm, according to some embodiments of the present disclosure, the first reflective layer, the second reflective layer and the third reflective layer may each include a plurality of zinc selenide layers and a plurality of silicon dioxide layers stacked alternately on each other, and the thickness of each zinc selenide layer is smaller than the thickness of each silicon dioxide layer. Table 1 below gives examples of the zinc selenide layer and the silicon dioxide layer included in the reflective film.

In Table 1, the zinc selenide layer and the silicon dioxide layer in the first reflective layer are denoted by letters c and d, respectively, the zinc selenide layer and the silicon dioxide layer in the second reflective layer are denoted by letters h and 1, respectively, and the zinc selenide layer and the silicon dioxide layer in the third reflective layer are denoted by a and b, respectively. In the example in Table 1, for the first reflective layer, the thickness of each zinc selenide layer is approximately 36.06 nm, the thickness of each silicon dioxide layer is approximately 64.26 nm, and the total number of zinc selenide layers and silicon dioxide layers may amount to 100. For the second reflective layer, the thickness of each zinc selenide layer is approximately 48.08 nm, the thickness of each silicon dioxide layer is approximately 85.68 nm, and the total number of zinc selenide layers and silicon dioxide layers may amount to 300. For the third reflective layer, the thickness of each zinc selenide layer is approximately 60.1 nm, the thickness of each silicon dioxide layer is approximately 107.09 nm, and the total number of zinc selenide layers and silicon dioxide layers may amount to 200.

TABLE 1

| Code | Material | Thickness/nm | Number of layers |
| --- | --- | --- | --- |
| c | ZnSe | 36.06 | cdcdcd . . . (1~100, 100 cyclic |
| d | SiO2 | 64.26 | alternations in total) |
| h | ZnSe | 48.08 | hlhlhl . . . (101~401, 300 cyclic |
| l | SiO2 | 85.68 | alternations in total) |
| a | ZnSe | 60.1 | ababab . . . (402~602, 200 cyclic |
| b | SiO2 | 107.09 | alternations in total) |

According to some embodiments of the present disclosure, the abovementioned reflective film can be manufactured by a layer-by-layer coating process. For example, it is possible to firstly fabricate a zinc selenide layer, and then sputter a silicon dioxide material on the fabricated zinc selenide layer to form a silicon dioxide layer. The above process is repeated to form multiple zinc selenide layers and dioxide silicon layers that alternate with each other.

For the technical solution provided by an embodiment of the present disclosure, by disposing the liquid crystal display module and the fingerprint identification module respectively on two sides of the reflective film, the visible light propagating in the liquid crystal display module is reflected by the reflective film and cannot pass through the reflective film, the invisible light emitted by the fingerprint identification module can pass through the reflective film to reach an object (for example, a finger) to be identified, and the fingerprint identification module can receive the invisible light reflected by the finger to perform fingerprint identification. As a result, there is no need to make a light-through hole in the color filter substrate of the liquid crystal display module, which avoids the problem of dark display regions resulting from the light-through hole in the color filter substrate.

Returning to FIG. 2, in the example of FIG. 2, the liquid crystal display module comprises a front light source and a display unit 2 on a first side of the reflective film 1. The display unit 2 is located between the front light source (7, 8) and the reflective film 1, and comprises a liquid crystal layer. The front light source includes a light guide plate 8 and a visible light emitting element 7. The light guide plate is configured to receive visible light from the visible light emitting element 7 and guide the visible light to the display unit 2. In some embodiments, the display unit 3 may comprise an array substrate and a color filter substrate on two sides of the liquid crystal layer. Further, the display unit 3 may further comprise a first polarizer on a side of the array substrate away from the liquid crystal layer and a second polarizer on a side of the color filter substrate away from the liquid crystal layer. Of course, the specific structure of the display unit 3 is not limited by the example described herein, and those skilled in the art can make any modification or substitution for the above example of the display unit 3 as long as the basic image display function can be realized. Examples of the visible light emitting element 7 include, but are not limited to, various types of LEDs, such as Micro-LEDs.

Figure 4:
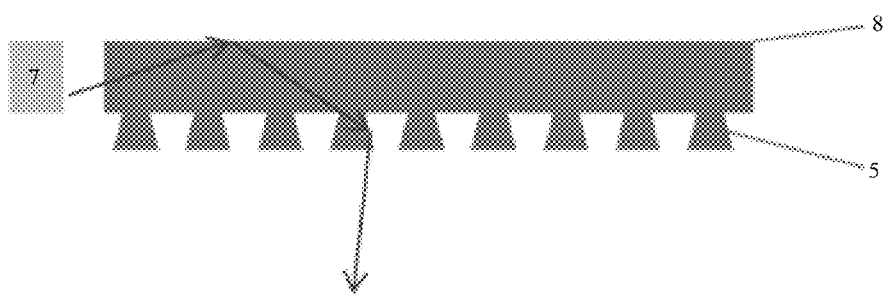
FIG. 4 is an exemplary sectional view of a light guide plate provided by an embodiment of the present disclosure.

According to another embodiment of the present disclosure, the light guide plate comprises a body and a plurality of light extraction protrusions, and the plurality of light extraction protrusions are located on a light exit surface of the body facing the display unit. For the sake of clarity, FIG. 4 separately shows a sectional view of the light guide plate with light extraction protrusions, and the light emitting element 7 is also shown. As shown in FIG. 4, a plurality of light extraction protrusions 5 are attached to the light exit surface of the body of the light guide plate 8. In this way, visible light emitted from the visible light emitting element 7 will be emitted out through the light extraction protrusions 5 and then enter the display unit 3. The arrangement of the light extraction protrusions can change the incident direction of visible light entering the display unit, so that different light extraction protrusions may be designed according to the requirements for the performance of a display product. For example, the structure of the light extraction protrusion can be specifically designed to realize that the visible light, after leaving the light guide plate 8, enters the display unit in a manner of being substantially perpendicular to the surface of the display unit, thereby improving the light utilization efficiency. In the example of FIG. 4, the light extraction protrusions 5 and the body of the light guide plate are formed into an entirety, that is, the light extraction protrusions 5 are directly connected to the body. In a further embodiment, the light extraction protrusions may be connected to the body in a suitable manner. For example, the light extraction protrusions may be glued to the body by using an adhesive material. FIG. 2 schematically shows a glue layer 6 between the body of the light guide plate 8 and the light extraction protrusions 5. Alternatively, in other embodiments, the light extraction protrusions may be fixed to the body by an appropriate mechanical connection, which is not specifically limited in embodiments of the present disclosure.

Figure 5:
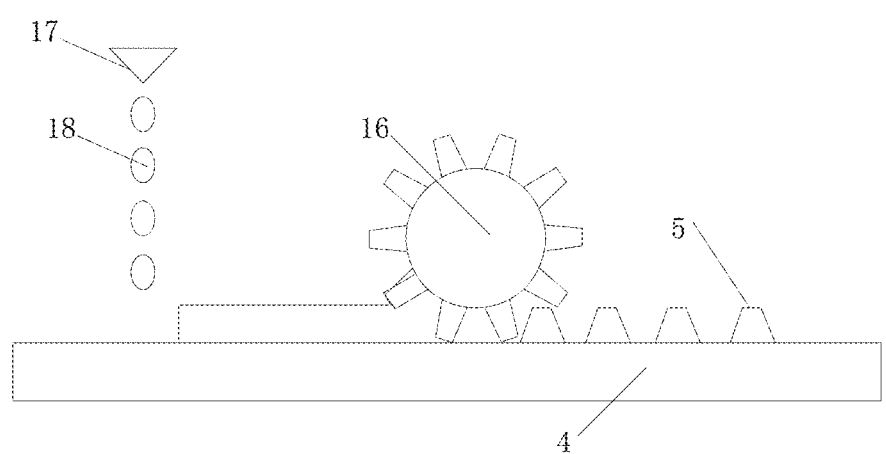
FIG. 5 illustrates a process of forming light extraction protrusions of the light guide plate according to an embodiment of the present disclosure.

According to some embodiments of the present disclosure, the light extraction protrusion 5 and the body of the light guide plate can be separately manufactured. FIG. 5 illustrates a method of manufacturing a light extraction protrusion. A transparent substrate 4 is prepared, and the glue 18 for forming a light extraction protrusion 5 is dripped onto the transparent substrate 4 through a glue nozzle 17. After the glue drips on the transparent substrate, the glue is leveled, and then a pattern of the light extraction protrusion is transferred onto the glue layer formed by leveling by means of a transfer roller 16. The glue pattern obtained by transferring is then solidified to form a plurality of light extraction protrusions 5. Next, the body of the light guide plate may be fixed to the top of the light extraction protrusions in a manner such as gluing. FIG. 2 shows a plurality of light extraction protrusions 5 formed on the transparent substrate 4, and the light extraction protrusions 5 are bonded to the body of the light guide plate through the glue layer 6. The transparent substrate 4 may also be bonded to the display unit 2 in an appropriate manner such as gluing (for example, by means of an adhesive layer 3 shown in FIG. 2).

Figure 6:
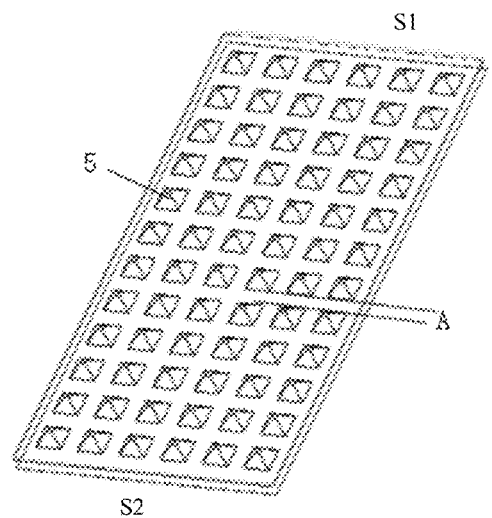
FIG. 6 is a partial perspective view of a light guide plate comprising light extraction protrusions provided by an embodiment of the disclosure.

According to some embodiments of the present disclosure, the plurality of light extraction protrusions include a frustum. FIG. 6 shows a partial perspective view of the light guide plate when viewed from the light exit surface of the body of the light guide plate. Each of the light extraction protrusions 5 is in the shape of a frustum. The frustum includes a first surface attached to the body of the light guide plate and a second surface opposite to the first surface, and the area of the second surface is larger than that of the first surface. The light extraction protrusion in the form of a frustum shown in FIG. 6 may have a section similar to that of the light extraction protrusion shown in FIG. 5 or FIG. 4.

Figure 7:
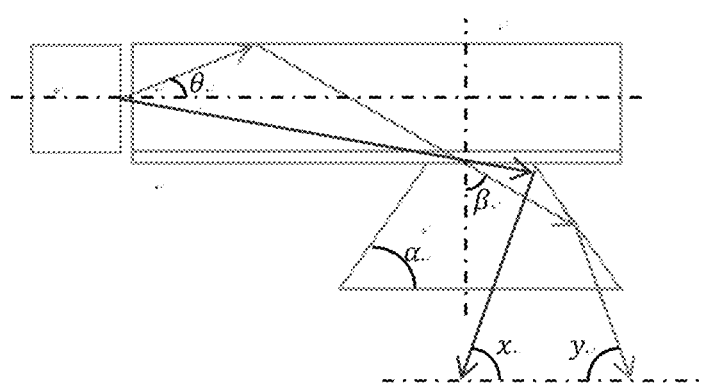
FIG. 7 is a schematic diagram for determining an angle between the bottom surface and the side surface of a frustum of the light guide plate provided by an embodiment of the disclosure.

Further, as shown in FIG. 6, the frustum 5 may include a regularly quadrangular frustum, that is, the frustum 5 includes four side surfaces between the first surface and the second surface. FIG. 7 schematically shows a light path diagram of light emitted from the visible light emitting element, which is emitted out after passing through the body of the light guide plate and the light extraction protrusion in the shape of a regularly quadrangular frustum. As shown in FIG. 7, visible light emitted by the visible light emitting element enters the body of the light guide plate through the light incident surface of the body of the light guide plate and then propagates by means of total reflection. The light is refracted at the light extraction protrusion 5 and leaves the light guide plate. The angle of light with respect to the horizontal direction upon entering the body of the light guide plate is set to be $\theta$, and the body of the light guide plate includes a polycarbonate material with a refractive index of 1.58, then the maximum value of the angle $\theta$ can be set to be $\arcsin(1/1.58) = \pm 39.3°$. Correspondingly, after the visible light enters the light extraction protrusion 5, it has an angle $\beta$ ranging from 50.7° to 90° with respect to the vertical direction, and has an angle ranging from 0° to 39.3° with respect to the horizontal direction.

Supposing that the angle between the second surface of the frustum with a larger area and a side surface thereof is $\alpha$, the angle between the visible light reflected by the side surface of the frustum and the horizontal direction can be expressed as:

$$y = 2\alpha - 39.3°$$

$$x = 180° - 2\alpha$$

As shown in FIG. 7, in order to enable the visible light exiting through the light extraction protrusion 5 to enter the display unit in a manner of being substantially perpendicular to the surface of the display unit (that is, substantially in the vertical direction), $x = y$, and thus it can be obtained by calculation that $\alpha \approx 54.8°$. In this case, the light exit direction of the light extraction protrusion 5 is in the vertical direction, that is, 90° with respect to the horizontal line.

According to some embodiments of the present disclosure, it is possible to set the angle of the visible light leaving from the light extraction protrusion that deviates from the vertical direction to be within 30°, that is, the angle with respect to the horizontal line is in the range of 60° to 120°, then $39.8°≤α≤74.8°$. As a result, the light exit efficiency of the light guide plate can be increased, the light utilization efficiency can be improved, and the image display quality of the display panel can also be improved at the same time.

In some embodiments, the distance from the invisible light sensor in the fingerprint identification module to the light incident surface of the body is smaller than the distance from the invisible light sensor to the side surface of the body. That is to say, the orthographic projection of the fingerprint identification module on the body of the light guide plate is closer to the light incident surface of the body of the light guide plate (for example, the body of the light guide plate shown in FIG. 2 is close to the side surface of the light emitting element 7). This can further improve the accuracy of fingerprint identification.

Continuing to refer to FIG. 6, in some embodiments, the plurality of light extraction protrusions 5 are distributed on the light exit surface of the body at intervals, and the distribution density of the light extraction protrusions in a region of the light exit surface close to the visible light emitting element is smaller than the distribution density of the light extraction protrusions in a region of the light exit surface far away from the visible light emitting element. That is to say, the closer the light extraction protrusions are to the light incident surface of the body of the light guide plate, the more sparsely the light extraction protrusions will be arranged. Accordingly, the spacing between the light extraction protrusions in the region of the light exit surface close to the visible light emitting element is relatively large, and the fingerprint identification module is arranged relatively close to the light incident surface of the body of the light guide plate, so more invisible light will be transmitted through the larger spacing between the light extraction protrusions, which can reduce loss of invisible light in the propagation path and thereby improve the accuracy and clarity of fingerprint identification. As shown in FIG. 6, a side surface (light incident surface) of the light guide plate close to the visible light emitting element is marked as S1, and the other side surface opposite to the light incident surface S1 is marked as S2. Therefore, the closer the light extraction protrusions are to the light incident surface S1, the larger the spacing A between the light extraction protrusions will be.

Further, in another embodiment, the distribution density of the light extraction protrusions on the light exit surface gradually increases along a direction from the light incident surface S1 to the side surface S2.

Referring back to FIG. 2, according to a further embodiment of the present disclosure, the fingerprint identification module further comprises a lens 15. The lens 15 is configured to converge invisible light reflected after passing through the reflective film 1 to the invisible light sensor 12. The lens 15 is arranged on a side of the invisible light sensor 12 facing the reflective film 1. By disposing the lens 15, the reflected invisible light in a larger range can be concentrated on the sensor 12, which is beneficial to high-efficiency fingerprint identification.

FIG. 2 also schematically shows other structures in the example of the fingerprint identification module. For example, the fingerprint identification module further comprises a bracket 10, a light emitting element 11 (for example, an LED) disposed on the top of the bracket 10 for emitting invisible light, a die attach film (DAF) 14 and a board to board connector (BTB) 13 disposed below the invisible light sensor 12. The die attach film 14 and the board to board connector 13 can support the invisible light sensor 12 and transmit signals of the invisible light sensor 12 to other external circuits to analyze and process the signals sensed by the sensor.

According to an embodiment of the disclosure, the wavelength range of invisible light includes 800 nm to 1200 nm (infrared light), and the wavelength range of visible light includes 380 nm to 780 nm. That is, in this embodiment, the invisible light emitting element is a light emitting element capable of emitting infrared light. Another aspect of the disclosure provides a display device comprising the display panel described in any one of the foregoing embodiments. The display device includes, for example, but is not limited to, any electronic product or component with a display function, such as an intelligent mobile phone, a tablet computer, and the like.

It should be understood that the orientations or positional relationships indicated by the terms "center", "longitudinal", "transverse", "upper", "lower", "front", "rear", "left", "right", "vertical", "horizontal", "top", "bottom", "inner", "outer", etc. are based on the orientations or positional relationships shown in the drawings, and are only for the convenience of describing the disclosure and simplifying the description, rather than indicating or implying that the indicated device or element must have a specific orientation, or be constructed and operated in a specific orientation, and therefore cannot be understood as a limitation to the scope of the present application. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. Unless otherwise specified, "plurality" herein means two or more.

What has been described above is only part of the embodiments of the present application and explanations of the applied technical principles. Those skilled in the art should understand that the technical solutions involved in the present disclosure are not limited to embodiments formed by specific combinations of the above technical features, and should also encompass other embodiments formed by any combinations of the above technical features or their equivalent features without departing from the spirit of the present disclosure. For example, the embodiments formed by replacing the above features disclosed herein with other features having similar functions.

The invention claimed is:

1. A display panel comprising: a liquid crystal display module, a reflective film, and a fingerprint identification module;

wherein the liquid crystal display module is located on a first side of the reflective film, and the fingerprint identification module is located on a second side of the reflective film opposite to the first side, wherein the fingerprint identification module comprises an invisible light emitting unit and an invisible light sensor, the invisible light emitting unit is configured to emit invisible light in a direction towards the reflective film, the invisible light sensor is configured to receive invisible light reflected, wherein the reflective film is configured to transmit the invisible light and reflect visible light reaching the reflective film through the liquid crystal display module, wherein the liquid crystal display module comprises a front light source and a display unit on the first side of the reflective film, the display unit is between the front light source and the reflective film, and the display unit comprises a liquid crystal layer, wherein the front light source comprises a light guide plate and a visible light emitting element, the light guide plate is configured to receive visible light from the visible light emitting element and guide the visible light to the display unit, and wherein the light guide plate comprises a body and a plurality of light extraction protrusions, the plurality of light extraction protrusions is located on a light exit surface of the body facing the display unit.

2. The display panel according to claim 1, wherein the reflective film comprises a plurality of reflective layers having different refractive indexes.

3. The display panel according to claim 2, wherein each of the plurality of reflective layers comprises zinc selenide and silicon dioxide.

4. The display panel according to claim 3, wherein the plurality of reflective layers comprises a first reflective layer, a second reflective layer and a third reflective layer, wherein the second reflective layer is between the first reflective layer and the third reflective layer, and a thickness of the third reflective layer is larger than a thickness of the first reflective layer and smaller than a thickness of the second reflective layer.

5. The display panel according to claim 4, wherein each of the first reflective layer, the second reflective layer and the third reflective layer comprises a plurality of zinc selenide layers and a plurality of silicon dioxide layers stacked alternately on each other, wherein a thickness of each of the zinc selenide layers is smaller than a thickness of each of the silicon dioxide layers.

6. The display panel according to claim 1, wherein the display panel further comprises a transparent substrate between the plurality of light extraction protrusions and the display unit, the transparent substrate is configured to support the plurality of light extraction protrusions.

7. The display panel according to claim 1, wherein the plurality of light extraction protrusions comprise a frustum, wherein the frustum comprises a first surface attached to the body and a second surface opposite to the first surface, wherein an area of the second surface is greater than an area of the first surface.

8. The display panel according to claim 7, wherein the frustum comprises a regularly quadrangular frustum, the regularly quadrangular frustum comprising a side surface between the first surface and the second surface, wherein the second surface and the side surface forms an angle ranging from 39.8° to 74.8°.

9. The display panel according to claim 1, wherein a distance from the invisible light sensor in the fingerprint identification module to a light incident surface of the body is smaller than a distance from the invisible light sensor to the side surface of the body.

10. The display panel according to claim 9, wherein the plurality of light extraction protrusions are distributed on the light exit surface of the body at intervals, wherein a distribution density of the light extraction protrusions in a region of the light exit surface close to the visible light emitting element is smaller than a distribution density of the light extraction protrusions in a region of the light exit surface away from the visible light emitting element.

11. The display panel according to claim 10, wherein the body of the light guide plate comprises a light incident surface for receiving visible light from the visible light emitting element and a side surface opposite to the light incident surface, wherein a distribution density of the light extraction protrusions on the light exit surface gradually increases along a direction from the light incident surface to the side surface.

12. The display panel according to claim 1, wherein the fingerprint identification module further comprises a lens, the lens is configured to converge invisible light reflected after passing through the reflective film to the invisible light sensor.

13. The display panel according to claim 1, wherein a wavelength range of the invisible light comprises 800 nm to 1200 nm, and a wavelength range of the visible light comprises 380 nm to 780 nm.

14. A display device comprising the display panel according to claim 1.

15. The display device according to claim 14, wherein the reflective film comprises a plurality of reflective layers having different refractive indexes.

16. The display device according to claim 15, wherein each of the plurality of reflective layers comprises zinc selenide and silicon dioxide.

17. The display device according to claim 16, wherein the plurality of reflective layers comprises a first reflective layer, a second reflective layer and a third reflective layer, wherein the second reflective layer is between the first reflective layer and the third reflective layer, and a thickness of the third reflective layer is larger than a thickness of the first reflective layer and smaller than a thickness of the second reflective layer.

* * * * *